United States Patent
Makino

(10) Patent No.: US 10,910,669 B2
(45) Date of Patent: Feb. 2, 2021

(54) ALKALI METAL HALIDE PRODUCTION METHOD, AND SULFIDE SOLID ELECTROLYTE PRODUCTION METHOD

(71) Applicant: IDEMITSU KOSAN CO., LTD., Tokyo (JP)

(72) Inventor: Takeshi Makino, Chiba (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 226 days.

(21) Appl. No.: 16/084,131

(22) PCT Filed: Mar. 14, 2017

(86) PCT No.: PCT/JP2017/010152
§ 371 (c)(1),
(2) Date: Sep. 11, 2018

(87) PCT Pub. No.: WO2017/159665
PCT Pub. Date: Sep. 21, 2017

(65) Prior Publication Data
US 2020/0168944 A1 May 28, 2020

(30) Foreign Application Priority Data
Mar. 14, 2016 (JP) .............................. 2016-049545

(51) Int. Cl.
*H01M 10/0562* (2010.01)
*C01D 15/04* (2006.01)
*H01M 10/0525* (2010.01)

(52) U.S. Cl.
CPC ........ *H01M 10/0562* (2013.01); *C01D 15/04* (2013.01); *H01M 10/0525* (2013.01); *C01P 2006/40* (2013.01); *H01M 2300/008* (2013.01); *H01M 2300/0091* (2013.01)

(58) Field of Classification Search
CPC ......... H01M 10/0562; H01M 10/0525; H01M 2300/008; H01M 2300/0091; C01D 15/04; C01P 2006/40; H01B 1/10; H01B 13/00
See application file for complete search history.

(56) References Cited

U.S. PATENT DOCUMENTS

| | | | | |
|---|---|---|---|---|
| 4,302,432 A * | 11/1981 | Polichnowski | ........ | C01D 15/04 423/487 |
| 5,262,137 A * | 11/1993 | Suzuki | .................. | C01D 15/04 423/179.5 |
| 8,075,865 B2 | 12/2011 | Deiseroth et al. | | |
| 8,962,194 B2 | 2/2015 | Senga et al. | | |
| 9,272,922 B2 | 3/2016 | Kanbe et al. | | |
| 9,444,121 B2 | 9/2016 | Yanagi et al. | | |
| 9,620,811 B2 | 4/2017 | Kambara et al. | | |
| 9,680,179 B2 | 6/2017 | Tsuchida et al. | | |
| 9,806,373 B2 * | 10/2017 | Kambara | .......... | H01M 10/0525 |
| 2004/0033191 A1* | 2/2004 | Wietelmann | .......... | H01M 6/164 423/499.1 |
| 2005/0161340 A1* | 7/2005 | Gordon | ..................... | C25C 3/02 205/618 |
| 2007/0160911 A1 | 7/2007 | Senga et al. | | |
| 2010/0290969 A1 | 11/2010 | Deiseroth et al. | | |
| 2010/0303708 A1 | 12/2010 | Kanbe et al. | | |
| 2013/0177821 A1 | 7/2013 | Tsuchida et al. | | |
| 2014/0272554 A1 | 9/2014 | Yanagi et al. | | |
| 2014/0302382 A1 | 10/2014 | Kambara et al. | | |
| 2016/0190638 A1* | 6/2016 | Sugiura | ............... | H01M 10/052 429/189 |
| 2017/0162901 A1* | 6/2017 | Chen | ...................... | C01D 15/00 |
| 2017/0194662 A1 | 7/2017 | Kambara et al. | | |

FOREIGN PATENT DOCUMENTS

| | | |
|---|---|---|
| JP | H07242414 A | 9/1995 |
| JP | 2004225144 A | 8/2004 |
| JP | 2005228570 A | 8/2005 |
| JP | 2013103851 A | 5/2013 |
| JP | 2013201110 A | 10/2013 |
| JP | 2013256416 A | 12/2013 |
| JP | 2014065637 A | 4/2014 |
| JP | 2014065638 A | 4/2014 |
| JP | 2015000826 A | 1/2015 |
| SU | 497233 A1 | 12/1975 |
| WO | 2009096447 A1 | 8/2009 |

OTHER PUBLICATIONS

International Search Report for PCT/JP2017/010152 dated Jun. 20, 2017.
Koh, T. et al, "Spectrophotometric Determination of Micro Amounts of Sulfide, Sulfate and Thiosulfate," Analytical Sciences, Dec. 1987, vol. 3, pp. 543-547.
English Abstract for JP2013103851, Publication Date: May 30, 2013.
English Abstract for JP2013256416, Publication Date: Dec. 26, 2013.
English Abstract for JP2014065637, Publication Date: Apr. 17, 2014.
English Abstract for JP2014065638, Publication Date: Apr. 17, 2014.
English Abstract of JPH07242414, Publication Date: Sep. 19, 1995.
English Abstract of JP2004225144, Publication Date: Aug. 12, 2004.
English Abstract of JP2015000826, Publication Date: Jan. 1, 2015.
English Abstract of SU497233, Publication Date: Dec. 30, 1975.

* cited by examiner

*Primary Examiner* — Michael L Dignan
(74) *Attorney, Agent, or Firm* — Millen White Zelano and Branigan, PC; John Sopp

(57) ABSTRACT

Provided is a method for producing an alkali metal halide, including causing a reaction of an alkali metal sulfide and a substance represented by the following general formula (1) in the absence of a solvent or in a solvent except for water:
$X_2$ (1), wherein X represents a halogen element.

12 Claims, No Drawings

ALKALI METAL HALIDE PRODUCTION METHOD, AND SULFIDE SOLID ELECTROLYTE PRODUCTION METHOD

TECHNICAL FIELD

The present invention relates to a method for producing an alkali metal halide and a method for producing a sulfide-based solid electrolyte.

BACKGROUND ART

In the field of all-solid batteries, heretofore, a sulfide-based solid electrolyte material has been known. For example, PTL 1 reports producing a sulfide glass by reaction of lithium sulfide and phosphorus sulfide followed by heat-treating the sulfide glass to give a glass ceramic electrolyte having a high ion conductivity (for example, see PTL 1). However, a higher ion conductivity is desired, and it is reported to produce a sulfide glass by reaction of lithium halide, lithium sulfide and phosphorus sulfide and to heat-treat the sulfide glass to give a glass ceramic electrolyte having a high ion conductivity (for example, see PTL 2).

The lithium halide contained in these raw material compositions is produced using a raw material that is an aqueous solution in the production process, or is produced through reaction in water, and therefore the lithium halide is produced as a hydrate thereof (for example, see PTLs 3 to 6).

When the lithium halide to be used as a raw material for a solid electrolyte contains water, the ion conductivity of the sulfide-based solid electrolyte may lower, and therefore, water must be removed from the lithium halide.

For example, for converting a lithium halide into an anhydride thereof, there are employed a method including preparing an LiI hydrate through contact of a lithium compound such as lithium carbonate, with iodine and a reducing agent in a water solvent to prepare an LiI hydrate, followed by baking it in an inert gas atmosphere or in vacuum at 300 to 440° C. to give an LiI anhydride (for example, PTL 3), a method including heating and drying a lithium halide solution to give a lithium halide hydrate, mixing the hydrate with an organic solvent having miscibility with water, and removing water from the hydrate through drying in azeotropy with the organic solvent to give a lithium halide anhydride (for example, PTL 4), and a method of removing water by heating under reduced pressure with stirring the lithium halide solution (for example, PTLs 5 and 6).

CITATION LIST

Patent Literature

PTL 1: JP-2005-228570A
PTL 2: JP-2013-201110A
PTL 3: JP-2013-103851A
PTL 4: JP-2013-256416A
PTL 5: JP-2014-65637A
PTL 6: JP-2014-65638A

SUMMARY OF INVENTION

Technical Problem

However, water removal from a lithium halide hydrate is not easy, and various ingenuities are necessary (PTLs 3 to 6).

The present invention has been made in consideration of the situation as above, and an object thereof is to obtain an anhydrous alkali metal halide without water removal from a lithium halide hydrate.

Solution to Problem

For solving the above-mentioned problems, the present inventor has assiduously studied and, as a result, have found that the problems can be solved by the following invention.
[1] A method for producing an alkali metal halide, including causing a reaction of an alkali metal sulfide and a substance represented by the following general formula (1) in the absence of a solvent or in a solvent except for water:

$$X_2 \qquad (1)$$

wherein X represents a halogen element.
[2] The method for producing an alkali metal halide according to the above [1], including causing the reaction using a grinding machine.
[3] The method for producing an alkali metal halide according to the above [2], wherein the grinding machine is a bead mill or a ball mill.
[4] The method for producing an alkali metal halide according to any of the above [1] to [3], including causing the reaction in toluene.
[5] The method for producing an alkali metal halide according to any of the above [1] to [3], including causing the reaction in a solvent in which the solubility of the alkali metal sulfide is 1% by mass or less.
[6] The method for producing an alkali metal halide according to the above [5], wherein the solvent is a hydrocarbon.
[7] The method for producing an alkali metal halide according to the above [5] or [6], wherein the solvent is an aromatic hydrocarbon.
[8] The method for producing an alkali metal halide according to any of the above [1] to [7], wherein the alkali metal sulfide is at least one selected from lithium sulfide and sodium sulfide.
[9] The method for producing an alkali metal halide according to any of the above [1] to [8], wherein the substance is at least one selected from bromine and iodine.
[10] The method for producing an alkali metal halide according to any of the above [1] to [9], wherein the alkali metal sulfide remains.
[11] The method for producing an alkali metal halide according to the above [10], wherein the remaining amount of the alkali metal sulfide is from 4 to 8 times relative to the molar ratio of the substance represented by the general formula (1).
[12] A method for producing a sulfide-based solid electrolyte, including producing a sulfide-based solid electrolyte using the alkali metal halide produced according to the alkali metal halide production method of any of the above [1] to [11].
[13] A method for producing a sulfide-based solid electrolyte, including producing a sulfide-based solid electrolyte using the alkali metal halide produced according to the alkali metal halide production method of any of the above [1] to [11], a lithium compound, and a phosphorus compound.

Advantageous Effects of Invention

According to the present invention, an anhydrous alkali metal halide can be obtained without water removal from a lithium halide hydrate.

First Embodiment

The first embodiment of the present invention (hereinafter this may be referred to as "the first embodiment") is described below.

Needless-to-say, the present invention is not interpreted to be limited to the first embodiment.

[Method for Producing Alkali Metal Halide]

The method for producing an alkali metal halide of the first embodiment is a method for producing an alkali metal halide, including causing a reaction of an alkali metal sulfide and a substance represented by the following general formula (1) in the absence of a solvent or in a solvent except for water:

$$X_2 \tag{1}$$

wherein X represents a halogen element.

In the first embodiment, reaction in a solvent is not indispensable. For example, an alkali metal sulfide and a substance $X_2$ may be reacted without using a solvent, and an alkali metal sulfide may be reacted with a substance $X_2$ in a grinding machine without using a solvent.

It is presumed that an alkali metal sulfide may react with a substance $X_2$ according to the following formula (I). The reaction shown by the formula (I) occurs on the surface of the alkali metal sulfide and would hardly occur inside the alkali metal sulfide.

$$L_2S + X_2 \rightarrow 2LX + S \tag{I}$$

wherein L represents an alkali metal, and X represents a halogen element.

In the first embodiment, preferably, a grinding machine is used. When an alkali metal sulfide is ground using a grinding machine, the surface of the alkali metal sulfide may be cut off to make the alkali metal sulfide not having reacted with the substance $X_2$ exposed out to react with the substance $X_2$. The grinding machine is described below.

The above-mentioned reaction does not form water, as shown by the formula (I), and therefore, the reaction system does not contain water. Consequently, the resultant alkali metal halide does not contain water. Therefore, according to the present invention, a step of removing water like in a conventional production method for an alkali metal halide is unnecessary, and the production process can be simplified and the production cost may be reduced.

[In the Absence of Solvent, or in Solvent Except for Water]

In the production method of the first embodiment, an alkali metal sulfide and the substance $X_2$ need to be reacted in the absence of a solvent or in a solvent except for water. In any of the case with no solvent or the case in a solvent except for water, preferably, the reaction is carried out in an inert gas atmosphere such as nitrogen or argon.

[Alkali Metal Sulfide]

The alkali metal sulfide is preferably granular.

Here, the mean particle size ($D_{50}$) of the alkali metal sulfide particles is preferably 10 μm or more and 2000 μm or less, more preferably 30 μm or more and 1500 μm or less, even more preferably 50 μm or more and 1000 μm or less. In this description, the mean particle size ($D_{50}$) means a particle size to reach 50% of all the particles as sequentially integrated from the particles having a smallest particle size on the particle size distribution cumulative curve drawn with particles, and the volumetric distribution is, for example, the mean particle size that can be measured using a laser diffraction/scattering particle size distribution measuring device.

Preferred examples of the alkali metal sulfide for use in the first embodiment include lithium sulfide ($Li_2S$), sodium sulfide ($Na_2S$), potassium sulfide ($K_2S$), rubidium sulfide ($Rb_2S$), and cesium sulfide ($Cs_2S$). In consideration of the fact that when an alkali metal halide having a smaller molecular weight is used in the case where a sulfide-based solid electrolyte is produced using, as a raw material, an alkali metal halide obtained by the use of an alkali metal sulfide, the ion conductivity of the resultant sulfide-based solid electrolyte tends to increase, lithium sulfide ($Li_2S$) and sodium sulfide ($Na_2S$) are preferred, and lithium sulfide ($Li_2S$) is more preferred.

One alone of these alkali metal sulfides may be used singly or plural kinds thereof may be used in combination, and in the case where plural kinds are used as combined, a combination of lithium sulfide ($Li_2S$) and sodium sulfide ($Na_2S$) is preferred from the viewpoint of increasing ion conductivity. Sodium is an alkali metal whose atomic weight is larger than that of lithium, and therefore in consideration of the fact that, using a light alkali metal, the ion conductivity of the resultant sulfide-based solid electrolyte tends to increase, using lithium sulfide ($Li_2S$) singly is especially preferred.

Preferably, the amount of water that may be contained as an impurity in the alkali metal sulfide is small.

The alkali metal sulfide usable in the first embodiment is as described above, and an example of a method for producing lithium sulfide is described below.

Lithium sulfide can be produced, for example, according to the method described in JP-7-330312A, JP-9-283156A, JP-2010-163356A, and JP-9-278423A. Specifically, lithium hydroxide is reacted with hydrogen sulfide in a hydrocarbon-based organic solvent at 70° C. to 300° C. to give lithium hydrosulfide, and next, the reaction liquid is dehydrosulfurized to give lithium sulfide (JP-2010-163356A).

Lithium hydroxide may be reacted with hydrogen sulfide at 130° C. or higher and 445° C. or lower to synthesize lithium sulfide (JP-9-278423A).

[Substance $X_2$]

The substance $X_2$ includes fluorine ($F_2$), chlorine ($Cl_2$), bromine ($Br_2$), and iodine ($I_2$). The substance $X_2$ is preferably chlorine ($Cl_2$), bromine ($Br_2$) or iodine ($I_2$), and a plurality of chlorine ($Cl_2$), bromine ($Br_2$) and iodine ($I_2$) may be used in combination.

This is because in the case where a sulfide-based solid electrolyte is produced using the substance $X_2$ and when the substance $X_2$ is chlorine ($Cl_2$), bromine ($Br_2$) or iodine ($I_2$), there is a high probability of producing an electrolyte having a high ion conductivity. From the same viewpoint, the substance $X_2$ is more preferably bromine ($Br_2$) or iodine ($I_2$), and may be both ($Br_2$) and iodine ($I_2$) for use herein.

Preferably, the amount of water as an impurity in the substance $X_2$ is small.

The ratio of the alkali metal sulfide to the substance $X_2$ (by mol) is preferably (10 to 90)/(90 to 10), more preferably (20 to 80)/(80 to 20), even more 10 preferably (30 to 70)/(70 to 30).

In the production method of the first embodiment, preferably, the raw material, alkali metal sulfide remains along with the formed alkali metal halide in the system. In such a case, the formed alkali metal halide and the alkali metal sulfide may be mixed and ground to give a mixture favorable as the raw material for a sulfide-based solid electrolyte. In addition, in the subsequent production of a sulfide-based solid electrolyte, it is unnecessary to newly add an alkali metal sulfide as a raw material, and the production process can be thereby simplified. The remaining amount of the alkali metal sulfide is preferably 4 to 8 times relative to the molar ratio of the substance $X_2$, more preferably 4 to 7 times, even more preferably 4 to 6 times.

[Solvent]

In the production method of the first embodiment, an alkali metal sulfide and a substance $X_2$ may be reacted in a solvent. Regarding the solvent, one in which the solubility of an alkali metal sulfide is 1% by mass or less is preferably used.

When an alkali metal sulfide is hardly soluble in the solvent, for example, alkali metal sulfide particles may exist in the solvent. On the other hand, when an alkali metal sulfide dissolves in the solvent, the alkali metal halide to be formed may also dissolve in the solvent. In such a case, it would be difficult to separate the elemental sulfur also to be formed and the alkali metal halide from each other, and consequently, the solubility of an alkali metal sulfide in the solvent is preferably 1% by mass or less.

The solubility of an alkali metal sulfide is more preferably 0.5% by mass or less, even more preferably 0.1% by mass or less, further more preferably 0.07% by mass or less.

The lower limit of the alkali metal sulfide solubility is not specifically limited.

Water dissolves an alkali metal sulfide, and is therefore not included in the solvent in which the solubility of an alkali metal sulfide is 1% by mass or less.

Here, the solubility of an alkali metal sulfide is a value measured as follows.

(Measurement of Solubility of Alkali Metal Sulfide)

An alkali metal sulfide is added to a solvent, and well mixed at 20° C. (room temperature). The presence of the alkali metal sulfide not having dissolved in the solvent in the solution is confirmed visually. Next, the resultant solution is analyzed according to inductively-coupled plasma (ICP) emission spectrometry using an inductively-coupled plasma (ICP) emission spectrometer. In that manner, the content of the alkali metal in the resultant solution, that is, the content of the alkali metal having dissolved in the solvent is measured, and the solubility of the alkali metal sulfide (% by mass) is thereby calculated.

In the case where a solvent is used, preferably, the substance $X_2$ dissolves therein. Accordingly, a risk of direct contact between the substance $X_2$ and the production apparatus such as the reactor can be reduced so that the corrosion of the apparatus can be prevented more effectively. In addition, since a solid alkali metal sulfide and the substance $X_2$ existing in the solvent are reacted, the reaction speed increases and therefore an alkali metal halide can be produced more efficiently.

Consequently, as the solvent, one capable of dissolving the substance $X_2$, preferably one in which the solubility of the substance $X_2$ is preferably 0.01% by mass or more is used, more preferably 0.03% by mass or more, even more preferably 0.05% by mass or more, especially preferably 0.1% by mass or more. The upper limit of the solubility of the substance $X_2$ is not specifically limited, but is, for example, 60% by mass or less, 55% by mass or less, or 10% by mass or less.

Here, the solubility of the substance $X_2$ is a value measured according to the following measurement method.

(Measurement of Solubility of Substance $X_2$)

A substance $X_2$ (2 g) is dissolved in 3 mL of a solvent, and stirred at room temperature (25° C.) for 20 minutes. 0.1 g of the supernatant is weighed, 1 g of an aqueous sodium thiosulfate solution (10% by mass, $Na_2S_2O_3$) is added to the supernatant and shaken for about 1 minute to confirm disappearance of the color of the solution. The concentration of the substance $X_2$ in the solution is quantified through ICP emission spectrometric analysis (high-frequency inductively-coupled plasma emission spectrometry) to calculate the solubility of the substance $X_2$.

For example, when the substance $X_2$ is bromine ($Br_2$), iodine ($I_2$), or chlorine ($Cl_2$), or when $X_2$ is bromine ($Br_2$), corrosion may be lowered.

In addition, the substance $X_2$ dissolves in the solvent, and therefore the unreacted substance $X_2$ can be readily removed from the alkali metal halide, and an alkali metal halide not containing the substance $X_2$ as an impurity or containing little the substance can be provided.

The solvent for use in the first embodiment is preferably one that does not dissolve the reaction product, alkali metal halide but dissolves the side product, sulfur. Here, sulfur is formed as a side product as shown by the above-mentioned formula (I), but an elemental sulfur, when existing in an electrolyte, may lower ion conductivity. A sulfide-based solid electrolyte having a high ion conductivity requires an optimum elemental ratio therein, and there is a possibility that presence of sulfur as an impurity in an alkali metal halide could not provide an optimum elemental ratio. Consequently, it is desirable to remove the elemental sulfur existing in an alkali metal halide as an impurity. Using a solvent that does not dissolves an alkali metal halide but does dissolve the side product, sulfur, sulfur may be readily removed from an alkali metal halide, and therefore an alkali metal halide not containing an elemental sulfur as an impurity or containing little elemental sulfur can be obtained.

Consequently, regarding the solvent, one capable of dissolving sulfur, for example, one in which the solubility of sulfur is 0.01% by mass or more is preferably used, more preferably 0.03% by mass or more, even more preferably 0.05% by mass or more, and especially preferably 0.1% by mass or more. The upper limit of the sulfur solubility is not specifically limited, but is, for example, 60% by mass or less, 55% by mass or less, or 10% by mass or less.

Here, the sulfur solubility is a value measured as follows.

(Measurement of Sulfur Solubility)

50 mL of a solvent is added to 10 g of sulfur, conditioned at 25° C. in an oil bath, and stirred for 2 hours. Subsequently, the supernatant is separated using a cannula (transport pipe) equipped with a glass filter. The separated supernatant is vacuumed to give dry sulfur. From the mass of the dry sulfur and the mass of the solvent in which the dry sulfur has dissolved, the sulfur solubility (% by mass) is calculated.

Preferred examples of the above-mentioned solvent include hydrocarbon solvents such as aliphatic hydrocarbon solvents, alicyclic hydrocarbon solvents, and aromatic hydrocarbon solvents; and carbon atom-containing solvents such as solvents containing a carbon atom and a hetero atom.

Examples of the aliphatic hydrocarbon solvent include hexane, pentane, 2-ethylhexane, heptane, octane, decane, undecane, dodecane, and tridecene; examples of the alicyclic hydrocarbon solvent include cyclohexane, and methylcyclohexane; examples of the aromatic hydrocarbon solvent include benzene, toluene, xylene, mesitylene, tert-butylbenzene, trifluoromethylbenzene, and nitrobenzene; and examples of the solvent containing a carbon atom and a hetero atom include carbon disulfide, diethyl ether, dibutyl ether, and tetrahydrofuran.

Among these, hydrocarbon solvents or solvents containing a carbon atom and a hetero atom are preferred, aromatic hydrocarbon solvents or solvents containing a carbon atom and a hetero atom are more preferred, and toluene or carbon disulfide is especially preferred.

In the case where bromine ($Br_2$) is used as the substance $X_2$, from the viewpoint of efficiently attaining the reaction between the bromine ($Br_2$) and the other raw material, especially saturated aliphatic hydrocarbon solvents, saturated alicyclic hydrocarbon solvents and aromatic hydrocarbon solvent is preferable, aromatic hydrocarbon solvent substituted with an electrophilic group is more preferable, among these, for example, tert-butylbenzene, trifluoromethylbenzene and nitrobenzene are preferably used. Here, the saturated aliphatic hydrocarbon solvents are preferably linear, saturated aliphatic hydrocarbon solvents.

The amount of the solvent to be used is preferably such that the total amount of the raw materials could be 0.01 to 1 kg in 1 liter of the solvent, more preferably 0.05 to 0.8 kg, even more preferably 0.1 to 0.5 kg. When the amount of the solvent used falls within the above range, the solvent can be readily removed from the reaction system.

In the production method for an alkali metal halide of the first embodiment, the reaction between the alkali metal sulfide and the substance $X_2$ may occur only on the surface of the alkali metal sulfide and the reaction could not fully go on. In such a case, it is desirable to mix and grind the raw materials, alkali metal sulfide and substance $X_2$. When ground, the raw material alkali metal sulfide may react with the substance $X_2$ more smoothly to give an alkali metal halide efficiently.

The mixing method is not specifically limited. For example, raw materials and optionally a solvent may be put into a production device where the solvent and the raw materials can be mixed, and mixed therein. The production device is not specifically limited so far as raw materials and a solvent, if any, can be mixed therein, and for example, a medium-assisted grinding machine may be used.

The medium-assisted grinding machine may be roughly grouped into a container-driven grinding machine and a medium-stirring grinding machine. The container-driven grinding machine includes a stirring tank, a grinding tank, and a ball mill and a bead mill including these as combined. The medium-stirring grinding machine includes various types of grinding machines of an impact grinding machine such as a cutter mill, a hammer mill and a pin mill; a tower-type grinding machine such as a tower mill; a stirring tank grinding machine such as an attritor, an aquamizer, and a sand grinder; a fluid tank grinding machine such as a viscomill, and a pear mill; a fluid tube grinding machine; an annular type grinding machine such as a co-ball mill; a continuous dynamic grinding machine; and a monoaxial or multiaxial kneading machine.

These grinding machines may be appropriately selected depending on the intended size thereof, and for a relatively small-size system, a container-driven grinding machine such as a ball mill or a bead mill may be used, while for large-scale or industrial-scale mass production, the other types of grinding machines are preferably used.

When these grinding machines are used, raw materials and a solvent, and also grinding media are put thereinto, and then the machine is driven to attain mixing and grinding therein. Here, raw materials, a solvent and grinding media are put into the machine, but the order of putting them thereinto is not limited.

For example, a device of a ball mill or a bead mill is described as an example. In these mills, the grain size of the media therein such as balls or beads (balls generally have a size of $\phi 2$ to 20 mm or so, and beads generally have a size of $\phi 0.02$ to 2 mm or so), the material thereof (for example, metals such as stainless, chrome steel, or tungsten carbide; ceramics such as zirconia or silicon nitride; minerals such as agate), the rotation number of the rotor and the time may be selected to attain mixing and grinding, and the particle size of the resultant alkali metal halide can be controlled.

Examples of a grinding vessel not using media for grinding include a high-pressure homogenizer (wet-type jet mill), an ultrasonic grinding machine, and a high-shear stirring machine.

In the first embodiment, these conditions are not specifically limited. For example, using a ball mill, especially a planetary ball mill, and using balls of ceramics, above all zirconia balls having a size of $\phi 1$ to 10 mm, raw materials may be mixed and ground at a rotor rotation number of 300 to 1000 rpm for 0.5 to 100 hours.

The reaction temperature is preferably −50° C. or higher and 200° C. or lower, more preferably 10° C. or higher and 120° C. or lower, even more preferably 20° C. or higher and 100° C. or lower, and further more preferably 20° C. or higher and 80° C. or lower.

In the first embodiment, after raw materials and a solvent, if any, have been mixed, raw materials may be further added thereto and mixed, and this operation may be repeated twice or more.

In the case where raw materials and a solvent are mixed and ground, additional raw materials may be further added and mixed or mixed and ground during mixing and grinding them and/or after that, and this operation may be repeated twice or more. For example, raw materials and a solvent are put into a ball mill or a bead mill, and mixed and ground therein, and during the mixing and grinding, additional raw materials may be further put into the container, and after mixing and grinding them (after the mixing and grinding is once stopped), raw materials may be put into the container, and mixing and grinding them may be restarted, or during mixing and grinding, and after that, additional raw materials may be put into the container.

[Removal of Solvent]

In the case where a solvent is used, the alkali metal halide contains the solvent, and therefore preferably, the solvent is removed. By removing the solvent, the side product sulfur may also be removed.

The solvent removal may be carried out according to a method where the solvent-containing alkali metal halide is once transferred to a container, and after the alkali metal halide has deposited therein, the supernatant solvent is removed.

The solvent may be removed by drying, which may be combined with removal of the supernatant solvent.

The alkali metal halide to be obtained according to the production method of the first embodiment is, from the viewpoint of using it as a raw material of a sulfide-based solid electrolyte of lithium batteries, preferably a lithium halide or a sodium halide, and above all, a lithium halide is preferred. The lithium halide is preferably lithium iodide or lithium bromide, and the sodium halide is preferably sodium iodide or sodium bromide. Above all, lithium iodide is preferably used as attaining excellent ion conductivity and high battery performance.

Second Embodiment

The second embodiment of the present invention (hereinafter this may be referred to as "the second embodiment") is described below.

Needless-to-say, the present invention is not interpreted to be limited to the second embodiment.

The method for producing an alkali metal halide of the second embodiment is a method for producing an alkali metal halide, which includes grinding raw materials in toluene and in which the raw materials contain an alkali metal sulfide and a substance represented by the following general formula (1).

$$X_2 \tag{1}$$

wherein X represents a halogen element.

The method for producing an alkali metal halide of the second embodiment is the same as that of the first embodiment except that the solvent is toluene, and toluene is the same as above and description thereof is therefore omitted.

[Method for Producing Sulfide-based Solid Electrolyte]

The method for producing a sulfide-based solid electrolyte of the present invention includes producing an alkali metal halide according to the above-mentioned production method and producing a sulfide-based solid electrolyte using raw materials containing the resultant alkali metal halide.

The sulfide-based solid electrolyte is a solid electrolyte having sulfur as an indispensable component, and means an electrolyte that maintains a solid form at 25° C. in a nitrogen atmosphere.

The sulfide-based sold electrolyte includes both an amorphous sulfide-based solid electrolyte and a crystalline sulfide-based solid electrolyte having a crystal structure. These sulfide-based solid electrolytes will be described in detail hereinunder.

The sulfide-based solid electrolyte preferably contains sulfur and phosphorus, more preferably contains at least one selected from lithium and sodium, and sulfur and phosphorus, and even more preferably contains lithium, sulfur and phosphorus. Specifically, the sulfide-based solid electrolyte preferably has lithium ion conductivity and sodium ion conductivity.

Production of a sulfide-based solid electrolyte for producing a sulfide-based solid electrolyte using raw materials containing an alkali metal halide is specifically for producing a sulfide-based solid electrolyte using preferably an alkali metal halide, a lithium compound and a phosphorus compound.

Examples of the lithium compound include lithium sulfide ($Li_2S$), lithium oxide ($Li_2O$), and lithium carbonate ($Li_2CO_3$). Above all, lithium sulfide is preferred.

The production method for lithium sulfide is the same as that for the raw material lithium sulfide, and description thereof is omitted here.

Preferred examples of the phosphorus compound include phosphorus sulfides such as diphosphorus trisulfide ($P_2S_3$), and diphosphorus pentasulfide ($P_2S_5$); and phosphate compounds such as sodium phosphate ($Na_3PO_4$), and lithium phosphate ($Li_3PO_4$). Above all, phosphorus sulfides are preferred, and diphosphorus pentasulfide ($P_2S_5$) is more preferred. The phosphorus compound may include an elemental phosphorus. The phosphorus compounds such as diphosphorus pentasulfide ($P_2S_5$) that are industrially produced and sold are usable with no specific limitation. These phosphorus compounds may be used alone or plural kinds thereof may be used in combination.

The proportion of each raw material to all the raw materials is not specifically limited. For example, in the case where $Li_2S$ (lithium sulfide) and $P_2S_5$ (diphosphorus pentasulfide) are used as the raw materials, the proportion of $Li_2S$ to the total of $Li_2S$ and $P_2S_5$ is preferably within a range of 70 to 80 mol %, more preferably within a range of 72 to 78 mol %, and even more preferably within a range of 74 to 76 mol %.

In the case where LiI and LiBr are used, for example, as the alkali metal halide, the ratio of the total amount of LiI and LiBr to all the raw materials to be used in producing a sulfide-based solid electrolyte is, though not specifically limited so far as the ratio is one that could provide a desired sulfide-based solid electrolyte, for example, preferably within a range of 3 to 40 mol %, more preferably within a range of 3 to 30 mol %, and even more preferably within a range of 3 to 25 mol %.

The ratio of LiBr to the total of LiI and LiBr (LiBr/(LiI+ LiBr)) is not specifically limited, and may be any desired ratio. Preferably, the ratio is one capable of providing a sulfide-based solid electrolyte having an Li ion conductivity on the same level as or a higher level than that of the sulfide-based solid electrolyte (the sulfide-based solid electrolyte as a comparative control) produced in the same manner except that LiBr is substituted with LiI in the composition, and is more preferably the ratio is one capable of providing a sulfide-based solid electrolyte having an Li ion conductivity on a higher level than that of the sulfide-based solid electrolyte as a comparative control. The proportion of LiBr is, for example, within a range of 1 mol % to 99 mol %, preferably within a range of 5 mol % to 75 mol %.

The production method for a sulfide-based solid electrolyte of this embodiment can be carried out by a treatment of mixing, stirring and grinding of raw materials containing an alkali metal halide. For example, the method may be carried out according to known methods such as a method using a kneading machine such as a multi-screw kneading machine, or the above-mentioned grinding machine; a melt-quench method where predetermined amounts of raw materials are put in a mortar and mixed therein and pelletized, and the resulting pellets are put in a carbon-coated quartz tube, sealed up in vacuum therein, then reacted at a predetermined temperature, and thereafter put into ice to be rapidly cooled, a mechanical milling method (MM method) where predetermined amounts of raw materials are mixed in a mortar, and reacted for a predetermined period of time using various ball mills or other grinding machines; or a slurry method of reacting raw materials in an organic solvent for a predetermined period of time.

The resultant sulfide-based solid electrolyte is an amorphous sulfide-based solid electrolyte containing at least an alkali metal element, a sulfur element, a phosphorus element and a halogen element. In this description, the amorphous sulfide-based solid electrolyte means that the X-ray diffraction pattern thereof in X-ray diffractometry is a halo pattern not substantially showing any other peak than the materials-derived peaks, irrespective of the presence or absence of peaks derived from the raw materials of the sulfide-based solid electrolyte.

The amorphous sulfide-based solid electrolyte has a high ion conductivity and can increase battery output.

Typical examples of the amorphous sulfide-based solid electrolyte include $Li_2S$—$P_2S_5$—LiI, $Li_2S$—$P_2S_5$—LiCl, $Li_2S$—$P_2S_5$—LiBr, $Li_2S$—$P_2S_5$—LiI—LiBr, $Li_2S$—$P_2S_5$—$Li_2O$—LiI, and $Li_2S$—$SiS_2$—$P_2S_5$—LiI. The kind of the element constituting the amorphous sulfide-based solid electrolyte can be identified, for example, using an ICP emission spectrometric apparatus.

The shape of the amorphous sulfide-based solid electrolyte is not specifically limited, and is, for example, granular. The mean particle size ($D_{50}$) of the granular amorphous sulfide-based solid electrolyte is, for example, within a range of 0.01 μm to 500 μm, or 0.1 μm to 200 μm.

The production method for the sulfide-based solid electrolyte of this embodiment may further include heating. By further heating, the amorphous sulfide-based solid electrolyte may be converted into a crystalline sulfide-based solid electrolyte.

The heating temperature may be appropriately selected depending on the structure of the amorphous sulfide-based solid electrolyte, and may be, for example, within a range of the peak top, as a starting point, of the endothermic peak observed on the lowest temperature side in differential thermal analysis of the amorphous sulfide-based solid electrolyte under a heating rate of 10° C./min, preferably ±40° C., more preferably ±30° C., even more preferably ±20° C. More specifically, the heating temperature is preferably 150° C. or higher, more preferably 170° C. or higher, even more preferably 190° C. or higher. On the other hand, the upper limit of the heating temperature is not specifically limited, and is preferably 300° C. or lower, more preferably 280° C. or lower, even more preferably 250° C. or lower.

The heating time is not specifically limited so far as a desired crystalline sulfide-based solid electrolyte can be produced within the time, and is, for example, preferably 1 minute or more, more preferably 10 minutes or more, even more preferably 30 minutes or more, and the upper limit of the heating time is not specifically limited, and is preferably 24 hours or less, more preferably 10 hours or less, even more preferably 5 hours or less.

Preferably, the heating is carried out in an inert gas atmosphere (for example, nitrogen atmosphere, argon atmosphere), or a reduced-pressure atmosphere (especially in vacuum). This is because the crystalline sulfide-based solid electrolyte can be prevented from being degraded (for example, oxidized). The heating method is not specifically limited, and for example, a method of using a hot plate, a vacuum heating apparatus, an argon gas atmosphere furnace or a baking furnace may be employed. Industrially, a horizontal drying machine, a horizontal shaking flow drying machine or the like having a heating means and a feeding mechanism may also be employed.

As described above, a crystalline sulfide-based solid electrolyte can be obtained by heating an amorphous sulfide-based solid electrolyte. The crystalline sulfide-based solid electrolyte is a solid electrolyte whose X-ray diffraction pattern in X-ray diffractometry shows peaks derived from the sulfide-based solid electrolyte, irrespective of the presence or absence of peaks derived from the raw materials for the sulfide-based solid electrolyte therein. Specifically, the crystalline sulfide-based solid electrolyte contains a crystal structure derived from the sulfide-based solid electrolyte, and a part thereof may be a crystal structure derived from the sulfide-based solid electrolyte or all thereof may be a crystal structure derived from the sulfide-based solid electrolyte. With that, the crystalline sulfide-based solid electrolyte may contain, as a part thereof, an amorphous sulfide-based solid electrolyte so far as it has the X-ray diffraction pattern as mentioned above.

More specifically, examples of the crystal structure of the crystalline sulfide-based solid electrolyte include an $Li_3PS_4$ crystal structure, an $Li_4P_2S_6$ crystal structure, an $Li_7PS_6$ crystal structure, and a crystal structure having peaks at $2\theta=20.2°$ and $23.6°$ (for example, JP-2013-16423A).

Here, the crystal structure having peaks at around $2\theta=20.2°$ and $23.6°$ is preferred.

The shape of the crystalline sulfide-based solid electrolyte is not specifically limited, and is, for example, granular. The mean particle size ($D_{50}$) of the granular crystalline sulfide-based solid electrolyte is, for example, within a range of 0.01 µm to 500 µm, or 0.1 µm to 200 µm.

Preferably, the crystalline sulfide-based solid electrolyte has a high Li ion conductivity, and the Li ion conductivity thereof at room temperature is preferably $1.0\times10^{-4}$ S/cm or more, more preferably $1.0\times10^{-3}$ S/cm or more, even more preferably $1.2\times10^{-3}$ S/cm or more.

The resultant sulfide-based solid electrolyte is one obtained using raw materials including an alkali metal halide not containing water, and therefore has a high ion conductivity and excellent battery performance. Accordingly, the sulfide-based solid electrolyte obtained according to the present invention is used in any use requiring Li ion conductivity, and in particular, the sulfide-based solid electrolyte is favorably used for batteries. The sulfide-based solid electrolyte may be used as a positive electrode layer or a negative electrode layer, or may also be used as an electrolyte layer. Each layer may be produced according to a known method.

Preferably, the battery has a collector in addition to the positive electrode layer, the electrolyte layer and the negative electrode layer, and the collector may be any known one. For example, a layer of Au, Pt, Al, Ti, or a layer formed by coating one reactive with the sulfide-based solid electrolyte, such as Cu, with Au or the like may be used.

EXAMPLES

Next, the present invention is described specifically with reference to Examples, but the present invention is not whatsoever restricted by these Examples.

Production Example 1

[Production of Lithium Sulfide ($Li_2S$)]

Lithium sulfide was produced and purified as follows.

A water-insoluble medium toluene (by Sumitomo Corporation) was dewatered to have a water content, as measured with a Karl Fischer moisture titrate, of 100 ppm. 303.8 kg of this toluene was put into a 500-L stainless reactor in a nitrogen atmosphere, then 33.8 kg of anhydrous lithium hydroxide (by Honjo Chemical Corporation) was put thereinto, and kept at 95° C. with stirring at 131 rpm with a twin-star stirrer.

This was heated up to 104° C. while hydrogen sulfide (by Sumitomo Seika Chemicals Co., Ltd.) was jetted thereinto at a supply rate of 100 L/min. An azeotropic gas of water and toluene was continuously discharged out of the reactor. The azeotropic gas was condensed with a condenser outside the system to remove water. During this, toluene of the same amount as that of the toluene having evaporated away from the system was continuously supplied to keep the reaction liquid level constant.

The water amount in the condensed liquid gradually decreased, and in 24 hours after hydrogen sulfide introduction, no water distillation became recognized. During the reaction, the solid was kept dispersed and stirred in toluene, and no water was separated from toluene.

After this, hydrogen sulfide was changed to nitrogen and introduced into the system at 100 L/min for 1 hour.

Example 1

A planetary ball mill (trade name: Classic Line P-7, manufactured by Fritsch Japan Co., Ltd.) was set up in a glove box filled with nitrogen (dew point: −75° C. or lower, Ar atmosphere). 0.156 g of lithium sulfide produced in Production Example 1, and 0.845 g of iodine were weighed, and put into a vessel (45 cc, made of zirconia) for a planetary ball mill. Further, 4 g of dewatered toluene (water content: 10 ppm or less) was put thereinto, and the vessel was completely sealed up. The vessel was set in the planetary ball mill, and driven for simultaneous mixing and grinding at a table rotation number of 500 rpm for 40 hours to prepare lithium iodide.

5 ml of dewatered toluene was added to the resultant slurry product containing a solvent and lithium iodide, in a glove box, collected in a Schlenk tube, and after a powder (lithium iodide) precipitated, the supernatant solvent was removed. Next, the solvent having remained in the powder was removed by drying in vacuum.

The resultant powder was analyzed through powdery X-ray diffraction (XRD) using an X-ray diffractometer (XRD) (Smart Lab Apparatus, manufactured by Rigaku Corporation), which confirmed that the powder was lithium iodide.

(Confirmation of Solubility of Lithium Sulfide in Toluene)

Lithium sulfide was added to toluene, and well mixed at 20° C. (room temperature). Presence of lithium sulfide not having dissolved in the solvent was visually confirmed. Next, the resultant solution was analyzed according to inductively-coupled plasma (ICP) emission spectrometry using an inductively-coupled plasma (ICP) emission spectrometer. Accordingly, the content of lithium in the resultant solution, that is, the content of lithium having dissolved in the solvent was measured, and the solubility of lithium sulfide (% by mass) was 0.003% by mass.

Example 2

0.992 g of lithium sulfide produced in Production Example 1 was put into an airtightly closable glass vessel (for example, Schlenk tube), and further 15 mL of dewatered toluene (water content: 10 ppm or less) was added thereto. 0.246 g of bromine was gradually added to the vessel, and further 0.391 g of iodine was added thereto. (Lithium sulfide/bromine/iodine (by mol)=0.02159/0.00154/0.00154. When bromine and iodine all react with lithium sulfide, lithium sulfide/lithium bromine/lithium iodine (by mol)=0.01851/0.00308/0.00308, that is, the amount of lithium sulfide is 6.0 times relative to the molar ratio of the substance represented by the formula (1).) Subsequently, after disappearance of the color of the solution was confirmed, the remaining solvent was removed by drying in vacuum to give a powder.

The resultant powder was analyzed through XRD, which confirmed that the powder was a mixture of lithium sulfide ($Li_2S$), anhydrous lithium bromide (LiBr) and anhydrous lithium iodide (LiI).

Example 3

A powder was produced in the same manner as in Example 2, except that in Example 2, 5.61 g of lithium sulfide, 50 mL of dewatered toluene, 2.13 g of bromine and 2.26 g of iodine were used. (Lithium sulfide/bromine/iodine (by mol)=0.1221/0.0133/0.0089. When bromine and iodine all react with lithium sulfide, lithium sulfide/lithium bromine/lithium iodine (by mol)=0.0999/0.0267/0.0178, that is, the amount of lithium sulfide is 4.5 times relative to the molar ratio of the substance represented by the formula (1).) The resultant powder was analyzed through XRD, which confirmed that the powder was a mixture of lithium sulfide ($Li_2S$), anhydrous lithium bromide (LiBr) and anhydrous lithium iodide (LiI).

Example 4

A powder was produced in the same manner as in Example 2, except that in Example 2, 2.83 g of lithium sulfide, 30 mL of dewatered cyclohexane (water content: 10 ppm or less) in place of 15 mL of dewatered toluene, 1.05 g of bromine and 1.11 g of iodine were used. (Lithium sulfide/bromine/iodine (by mol)=0.0616/0.066/0.044. When bromine and iodine all react with lithium sulfide, lithium sulfide/lithium bromine/lithium iodine (by mol)=0.506/0.0131/0.0087, that is, the amount of lithium sulfide is 4.6 times relative to the molar ratio of the substance represented by the formula (1).) The resultant powder was analyzed through XRD, which confirmed that the powder was a mixture of lithium sulfide ($Li_2S$), anhydrous lithium bromide (LiBr) and anhydrous lithium iodide (LiI).

Example 5

1.118 g of the mixture of lithium sulfide, anhydrous lithium bromide and anhydrous lithium iodide obtained in Example 4 and 0.882 g of phosphorus sulfide were weighed, and put into a vessel (45 cc, made of zirconia) for a planetary ball mill, and 4 g of dewatered toluene (water content: 10 ppm or less) was put thereinto, and the vessel was completely sealed up. The vessel was set in the above-mentioned planetary ball mill, and driven for simultaneous mixing and grinding at a table rotation number of 500 rpm for 40 hours. 5 ml of dewatered toluene was added to the resultant slurry product in a glove box, collected in a Schlenk tube, and after a powder (amorphous sulfide-based solid electrolyte) precipitated, the supernatant solvent was removed. Next, the solvent having remained in the powder was removed by drying in vacuum, and then the powder was heated at 210° C. for 3 hours to give a crystalline sulfide-based solid electrolyte. The ion conductivity of the sulfide-based solid electrolyte was 4.58 mS/cm.

The Li ion conductivity of the crystalline sulfide-based solid electrolyte is a value measured according to the following method.

The resultant sulfide-based solid electrolyte was molded to give circular pellets each having a diameter of 10 mmφ (cross section S: 0.785 cm$^2$) and a height (L) of 0.1 to 0.3 cm to be samples. Electrode terminals were led from top and bottom of each sample to measure the ion conductivity of the sample according to an AC impedance method (frequency range: 5 MHz to 0.5 Hz, amplitude: 10 mV) to draw a Cole-Cole plot. At around the right end of the arc observed in the high-frequency side region, the real number part Z' (Ω) at the point at which −Z" (Ω) is the smallest is referred to as the bulk resistance R (Ω) of the electrolyte, and the ion conductivity σ (mS/cm) was calculated according to the following equation.

$$R=\rho(L/S)$$

$$\sigma=1/\rho$$

In the present application, the lead-to-lead distance in the measurement was about 60 cm.

INDUSTRIAL APPLICABILITY

According to the production method of the present invention, the resultant alkali metal halide does not contain water and is therefore favorably used as a raw material for sulfide-based solid electrolytes.

The invention claimed is:

1. A method for producing a mixture of an alkali metal halide and an alkali metal sulfide, comprising causing a reaction of an alkali metal sulfide and a substance of the following formula (1) in a solvent excluding water in order to produce the alkali metal halide in mixture with an excess of alkali metal sulfide that remains unreacted and wherein the amount of the excess of alkali metal sulfide that remains unreacted in the mixture is from 4 to 8 times based on molar ratio of the substance represented by the formula (1):

$X_2$ (1)

wherein X represents a halogen element.

2. The method according to claim 1, comprising causing the reaction using a grinding machine.

3. The method according to claim 2, wherein the grinding machine is a bead mill or a ball mill.

4. The method according to claim 1, comprising causing the reaction in wherein the solvent is toluene.

5. The method according to claim 1, comprising causing the reaction in a solvent in which the solubility of the alkali metal sulfide is 1% by mass or less.

6. The method according to claim 5, wherein the solvent is a hydrocarbon.

7. The method according to claim 5, wherein the solvent is an aromatic hydrocarbon.

8. The method according to claim 1, wherein the alkali metal sulfide is at least one selected from lithium sulfide and sodium sulfide.

9. The method according to claim 1, wherein the substance is at least one selected from bromine and iodine.

10. A method for producing a sulfide-based solid electrolyte, comprising producing a sulfide-based solid electrolyte using a mixture of alkali metal halide and alkali metal sulfide produced by causing a reaction of an alkali metal sulfide and a substance of the following formula (1) in a solvent excluding water in order to produce the alkali metal halide in mixture with an excess of alkali metal sulfide that remains unreacted and wherein the amount of the excess of alkali metal sulfide that remains unreacted in the mixture is from 4 to 8 times based on molar ratio of the substance represented by the formula (1):

$X_2$ (1)

wherein X represents a halogen element.

11. A method for producing a sulfide-based solid electrolyte according to claim 10, wherein the mixture of alkali metal halide and alkali metal sulfide comprises a lithium compound and a phosphorus compound, and the resulting electrolyte comprises a lithium compound and a phosphorus compound.

12. The method according to claim 1, wherein the mixture of an alkali metal halide and an alkali metal sulfide produced is a slurry of solid alkali metal halide and solid alkali metal sulfide in the solvent.

* * * * *